(12) United States Patent
Hammud et al.

(10) Patent No.: US 11,826,731 B1
(45) Date of Patent: Nov. 28, 2023

(54) NANOCOMPOSITES OF METAL / METAL OXIDES FOR CATALYTIC DEGRADATION OF TOXIC POLLUTANTS IN WATER

(71) Applicant: KING FAISAL UNIVERSITY, Al-Ahsa (SA)

(72) Inventors: Hassan Hammud, Al-Ahsa (SA); Dolayl Al-Hudairi, Al-Ahsa (SA); Thirumurugan Prakasam, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/130,572

(22) Filed: Apr. 4, 2023

(51) Int. Cl.
| | |
|---|---|
| *B01J 21/18* | (2006.01) |
| *B01J 23/843* | (2006.01) |
| *B01J 37/00* | (2006.01) |
| *B01J 37/08* | (2006.01) |
| *C02F 101/10* | (2006.01) |
| *C02F 101/30* | (2006.01) |
| *C02F 101/34* | (2006.01) |
| *B01J 35/00* | (2006.01) |
| *C02F 1/70* | (2023.01) |

(52) U.S. Cl.
CPC ........... *B01J 23/8437* (2013.01); *B01J 21/18* (2013.01); *B01J 35/0013* (2013.01); *B01J 37/0072* (2013.01); *B01J 37/082* (2013.01); *B01J 37/086* (2013.01); *C02F 1/705* (2013.01); *C02F 2101/108* (2013.01); *C02F 2101/308* (2013.01); *C02F 2101/345* (2013.01); *C02F 2303/16* (2013.01); *C02F 2305/08* (2013.01)

(58) Field of Classification Search
CPC .. B01J 37/082; B01J 37/086; C02F 2101/308; C02F 2305/08
See application file for complete search history.

(56) References Cited

U.S. PATENT DOCUMENTS

| | | | |
|---|---|---|---|
| 7,758,755 B2 | 7/2010 | Diallo | |
| 9,687,818 B2 | 6/2017 | Siani et al. | |

FOREIGN PATENT DOCUMENTS

| | | | |
|---|---|---|---|
| BR | 102013024589 A1 | | 11/2015 |
| CN | 104056597 A | * | 9/2014 |
| CN | 110252305 A | * | 9/2019 |
| CN | 113410475 A | * | 9/2021 |
| CN | 114177848 B | | 8/2022 |
| RO | 129669 | | 7/2014 |
| WO | 2017168352 A1 | | 10/2017 |

OTHER PUBLICATIONS

Dong X—CN-104056597-A machine translation (Year: 2014).*
Cai Y—CN-110252305-A machine translation (Year: 2019).*
Hu J—CN-113410475-A machine translation (Year: 2021).*
Fatimah, et al.; " Synthesis of iron-based magnetic nanocomposites: A review"; Arabian J. of Chem., 14, 103301 (Jul. 2021).
Alotaibi, et al.; "Cobalt-carbon/silica nanocomposites prepared by pyrolysis of a cobalt 2,2'-bipyridine terephthalate complex for remediation of cationic dyes."; RSC Adv. 10: 17660, 2020.
Hammud, et al.; "Cobalt-Carbon Nanoparticles with Silica Support for Uptake of Cationic and Anionic Dyes from Polluted Water,"; Molecules, 26: 7489, 2021.

* cited by examiner

*Primary Examiner* — Bradley R Spies
(74) *Attorney, Agent, or Firm* — Nath, Goldberg & Meyer; Richard C. Litman

(57) ABSTRACT

Metal carbon and oxide nanocomposites prepared by a simple, low energy demanding, and high yield method are provided. The metal carbon nanocomposites can be prepared with or without a support such as silica, graphite, silicates, and zeolites. Both metal carbon and metal oxides nanocomposites are more efficient in catalytic reduction and oxidation of p-nitrophenol and azo dyes than other reported materials. They have high rate constants, number of catalytic cycles and catalytic turn over number (TON) compared to currently used materials.

12 Claims, 15 Drawing Sheets

NANOCOMPOSITES OF METAL / METAL OXIDES FOR CATALYTIC DEGRADATION OF TOXIC POLLUTANTS IN WATER

BACKGROUND

1. Field

The disclosure of the present patent application relates to a novel method for production of metal carbon and oxide nanocomposites, and particularly to the thus produced nanocomposites which can act as a catalyst to assist in the degradation of toxic pollutants in water.

2. Description of the Related Art

Nitrophenols and azo dyes waste from different pharmaceutical and textiles industries in water pose a risk to humanity. Clean water is essential to human health. It is also a critical feedstock in a variety of key industries including the electronics, pharmaceutical and food industries. Treatment of groundwater, lakes and reservoirs is often required to make water safe for human consumption. For wastewater, treatment is necessary to remove harmful pollutants from domestic and industrial liquid waste so that it is safe to return to the environment. Current water treatment systems are generally large, centralized systems that comprise a number of steps, including treatment with anaerobic organisms, oxidizers, chlorine, and flocculants.

Because of their inherent flexibility, decentralized water treatment systems could provide more robust and cost-effective means for dealing with (i) declining sources of freshwater, (ii) more stringent water quality standards and (iii) chemical and biological threats to local water supplies.

A number of water filtration processes designed to remove organic compounds and metal ions from contaminated wastes have been described in the literature. Two such processes are micellar-enhanced ultrafiltration (MEUF) (Scamehorn and Harwell, (1988) In *Surfactant Based Separation Processes*, Surfactant Science Series, Vol 33, Marcel Dekker, New York, Dunn et al., (1989) *Coll. Surf* 35:49, Baek et al., (2004) *J. Haz. Mater.* 1081:19, Richardson et al., (1999) *J. Appl. Polym. Sci.* 4:2290) and polymer supported ultrafiltration (PSUF) (Spivakov et al., (1985) *Nature* 315: 313, Geckeler et al., (1996) *Envir. Sci. Technol*, 30:725, Muslehiddinoglu et al., (1998) *J. Memb. Sci*, 140:251, Juang et al., (1993) *J. Membrane Sci.* 82:163). In a typical MEUF process, a surfactant is added to polluted water. The aqueous solution is then passed through an ultrafiltration membrane with pore sizes smaller than those of the organic/metal ion laden micelles. In PEUF, a water-soluble linear polymer with strong binding affinity for the target metal ions is added to contaminated water. The resulting solution is passed through an ultrafiltration membrane (UF) with pore sizes smaller than those of the metal ion-polymer complexes.

MEUF is based on the use of non-covalently bonded micelles to extract organic solutes and/or bind metal ions. Micelles are dynamic and flexible structures with finite lifetimes. Because of this, their size, shape, organic solubilization capacity, metal ion binding capacity and retention by UF membranes are very sensitive to surfactant concentration and solution physical-chemical conditions (e.g., pH, temperature, ionic strength, etc). Although the use of micellar solutions of height molecular weight block ABA copolymer of PEO-PPO-PEO surfactants could reduce surfactant losses to a certain extent (Richardson et al., (1999) *J. Appl. Polym. Sci.* 4:2290), the leakage of surfactant monomers remains a major problem in water treatment by MEUF.

In most cases, the surfactant solutions in MEUF processes are not very selective and have relatively low organic solute and metal ion binding capacity. For the most part, they solubilize organic solutes through partitioning in their hydrophobic core and bind metal ions through electrostatic interactions with their charged head-groups. Moreover, the development of surfactant solutions with redox, catalytic and biocidal activity remains a major challenge. Thus, MEUF has remained for the most part a separation process with limited practical applications.

The PSUF process has been primarily designed and evaluated to remove metal ions from contaminated wastewater streams. PSUF uses high molar mass linear polymers such as EDTA and macrocycles with amine groups (e.g., cyclams) that typically bind only one metal ion per molecule. While the components of a MEUF filtration system are somewhat adaptable to different functional groups, the PSUF process is not readily functionalizable, and neither MEUF nor PSUF have been shown to be capable of catalytic reactions.

Due to the ongoing demand for clean water and the limitations of the current methods, there is a significant need in the art for a new water filtration process. Thus, an efficient way of water remediation by degrading toxic chemicals with nano catalysts solving the aforementioned problems is desired.

SUMMARY

The present subject matter relates to metal carbon and oxide nanocomposites prepared by a simple, low energy demanding, and high yield method. The metal carbon nanocomposites can be prepared with or without a support such as silica, graphite, silicates, and zeolites. Both metal carbon and metal oxides nanocomposites are more efficient in catalytic reduction and oxidation of p-nitrophenol and azo dyes than other reported materials. They have high rate constants, number of catalytic cycles, and catalytic turn over number (TON) compared to currently used materials.

In an embodiment, the present subject matter relates to a method for preparing metal nanocomposites using chemical vapor condensation, the method comprising: providing a metal complex and a carbon source at room temperature; heating the metal complex and the carbon source to a temperature of about 700° C. to about 850° C. in multiple steps in an inert gas or vacuum furnace to evaporate and decompose the metal complex and the carbon source; forming catalyst nanoparticles comprising the evaporated metal complex and the evaporated carbon source; and cooling the catalyst nanoparticles to condense the catalyst nanoparticles into core-shell nanomaterials comprising central metal nanoparticles surrounded by a carbon shell.

In another embodiment, the present subject matter relates to a metal nanocomposite prepared according to the processes described herein, wherein the metal nanocomposite comprises core-shell nanomaterials comprising central metal nanoparticles surrounded by a carbon shell.

In a further embodiment, the present subject matter relates to a metal nanocomposite catalyst for filtering contaminated water, the catalyst comprising: core-shell nanomaterials comprising central metal nanoparticles surrounded by a carbon shell; wherein the central metal nanoparticles comprise a metal selected from the group consisting of iron, iron-cobalt, iron-nickel, iron-bismuth, iron oxide, iron-cobalt oxide, iron-nickel oxide, iron-bismuth oxide, and mixtures thereof; wherein the core-shell nanomaterials comprise up to about 40% by weight of the metal, minor amounts of oxygen and nitrogen, and carbon forming the remainder of the core-shell nanomaterials; wherein the catalyst is effective as a catalyst for filtering contaminants from water.

In one embodiment, the present subject matter relates to a method of decontaminating contaminated water, comprising: providing a quantity of water containing a quantity of a contaminant; contacting the quantity of water with an amount of the metal nanocomposite catalyst described herein; and catalytically reducing or oxidizing the contaminant, whereby a quantity of decontaminated water is produced.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
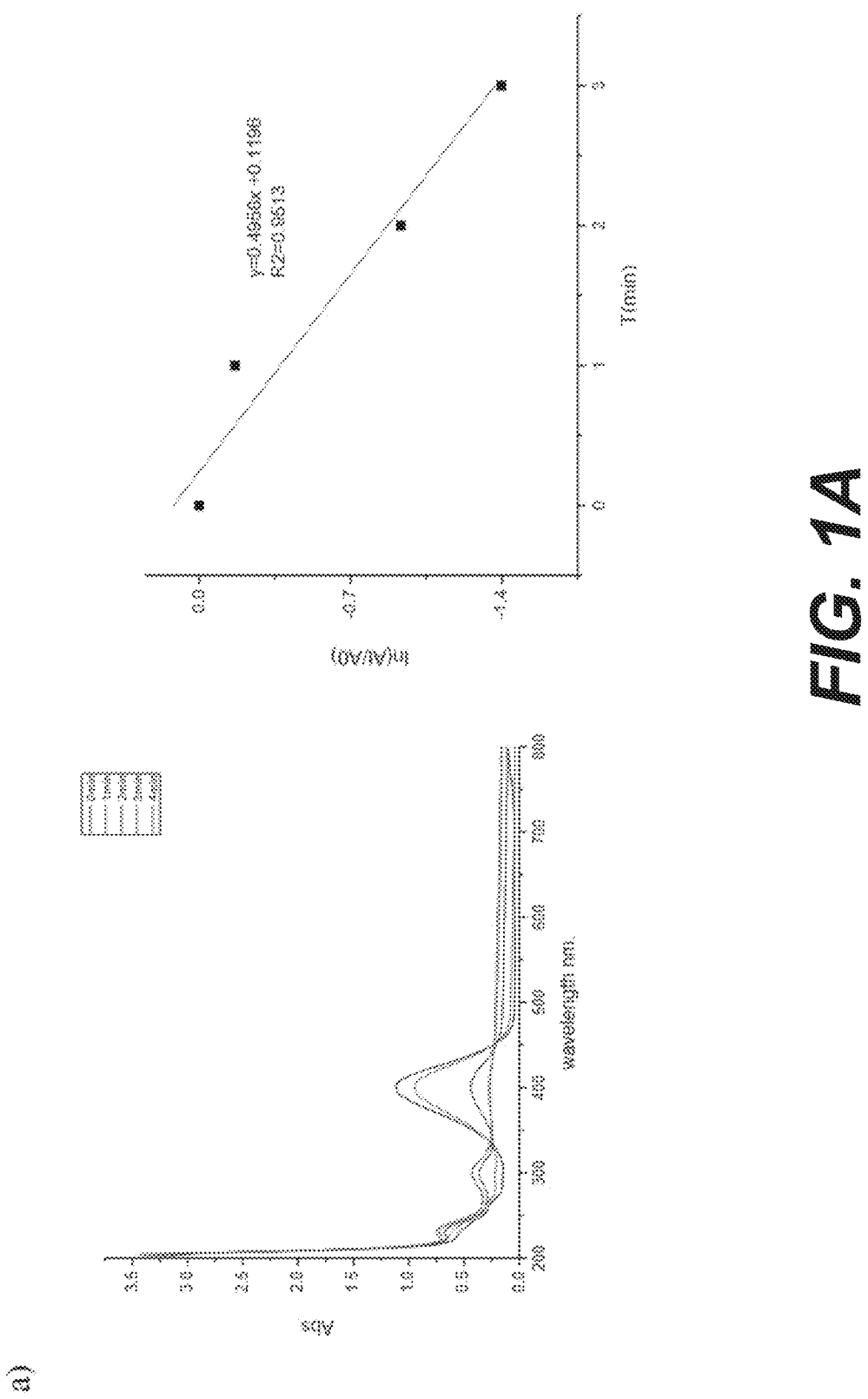
FIGS. 1A-1C are graphs showing the catalytic activity and kinetic rate for reduction of para-nitrophenol pollutant (PNP) with sodium borohydride ($NaBH_4$) by iron carbon nanocomposites (1A) 106C—Co, (1B) 106C—Ni, and (1C) 106C—Bi.
Figure 1B:
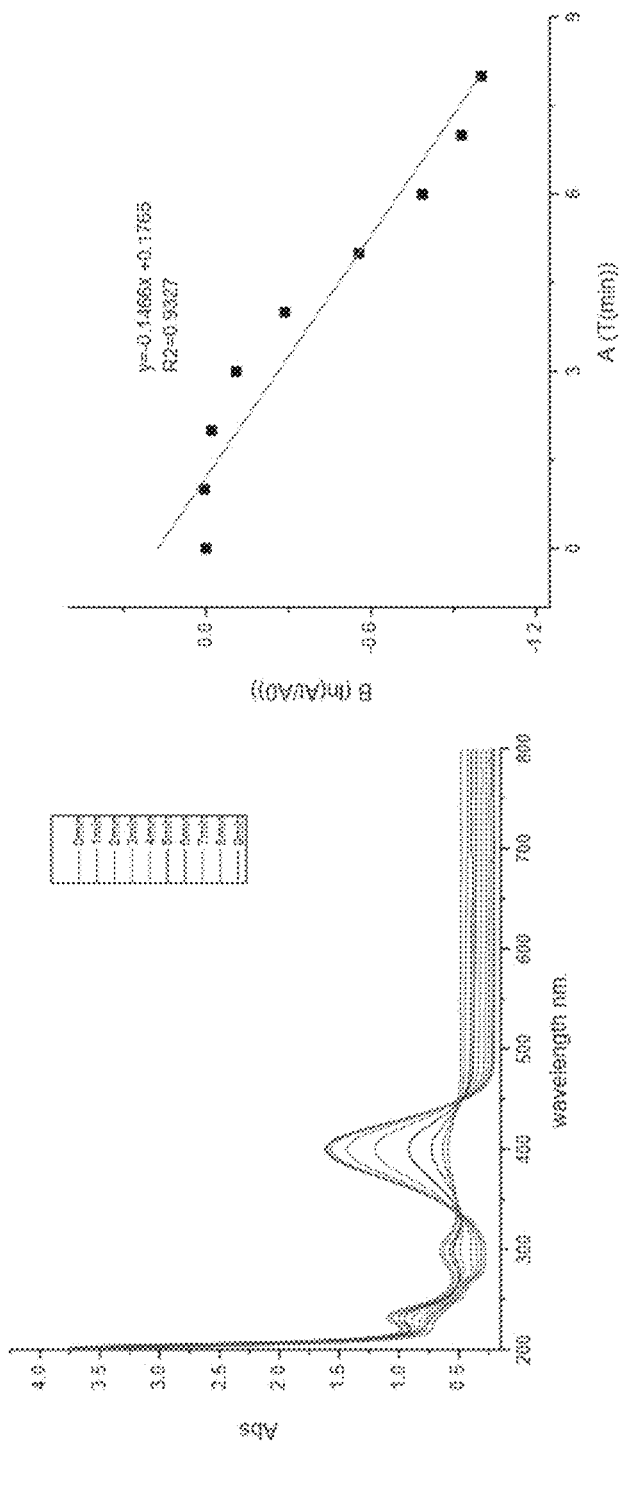
Figure 1C:
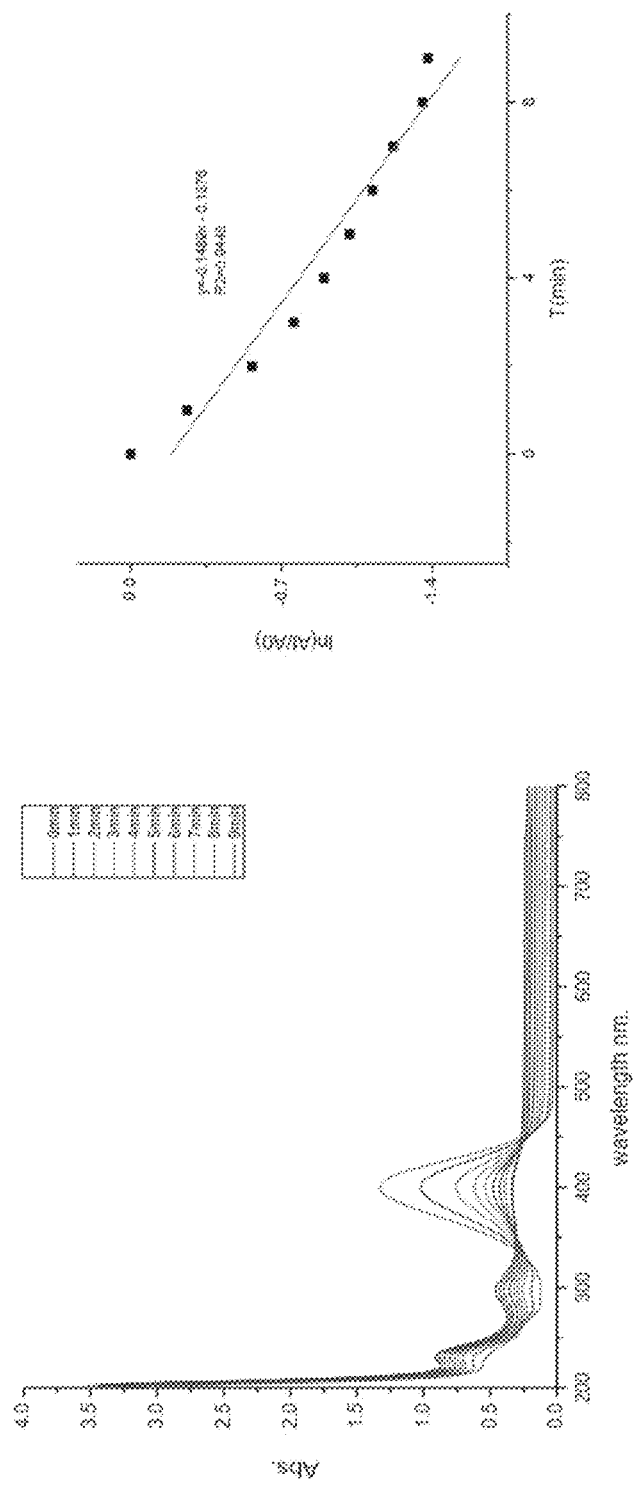
Figure 2:
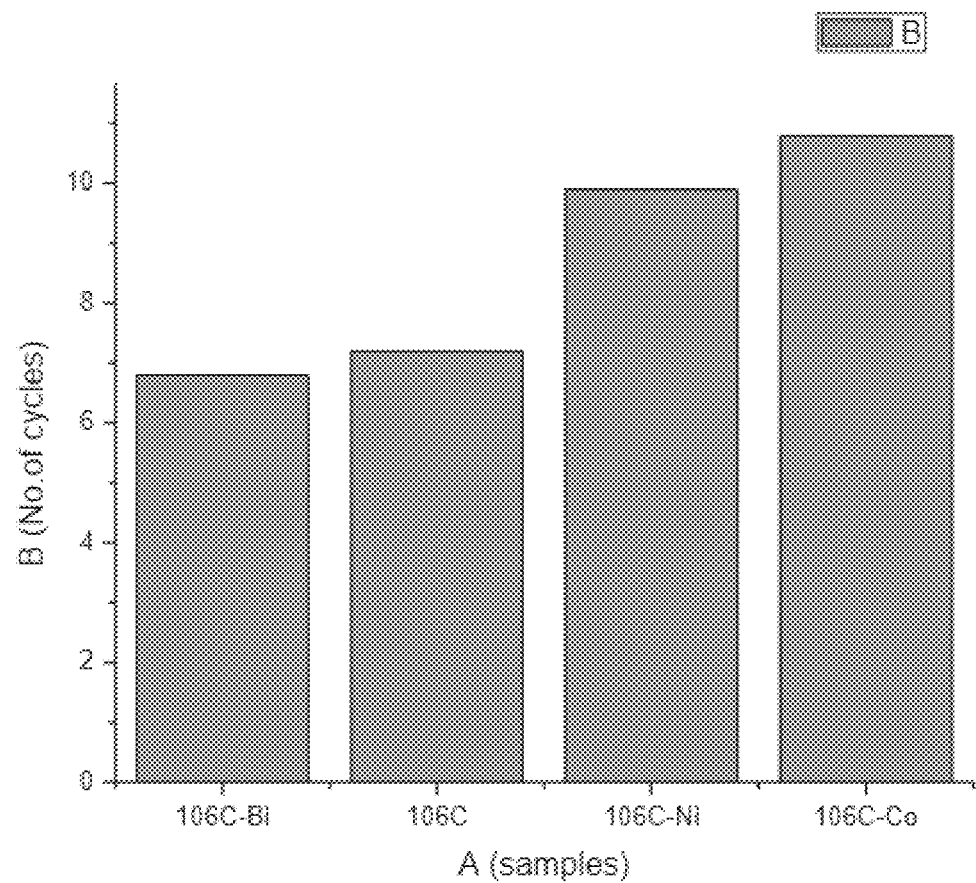
FIG. 2 is a chart showing a comparison of the number of cycles for PNP reduction by different carbon iron nanocomposites.
Figure 3A:
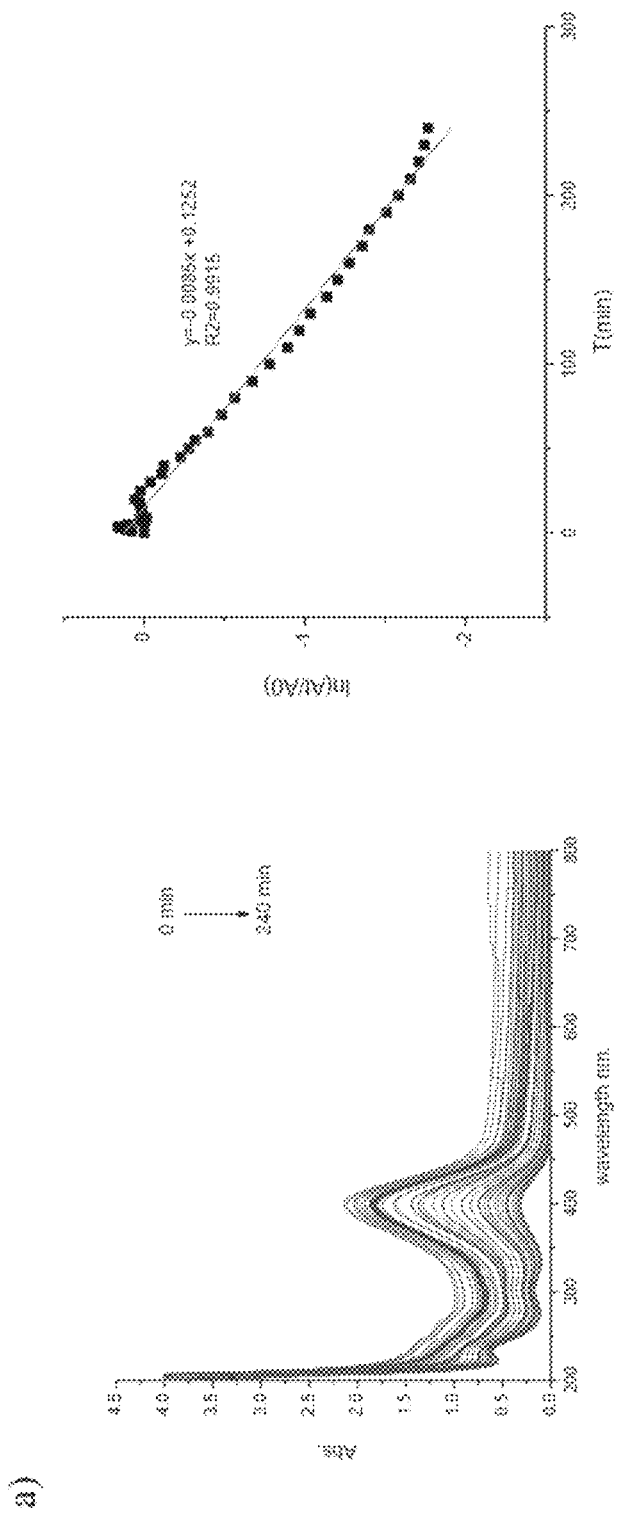
FIGS. 3A-3B are graphs showing the catalytic reduction activity and kinetic rate of PNP with $NaBH_4$ by iron oxide nanocomposites (3A) 106C—O and (3B) 106C—Ni—O.
Figure 3B:
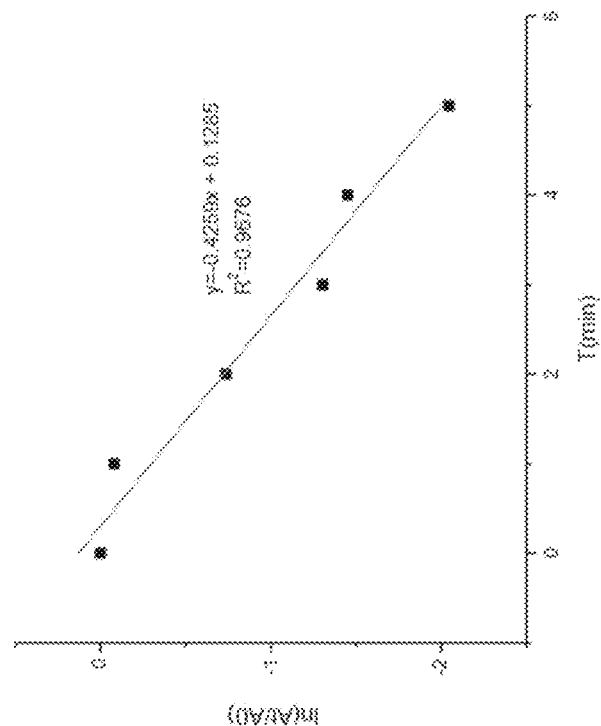
Figure 3B:
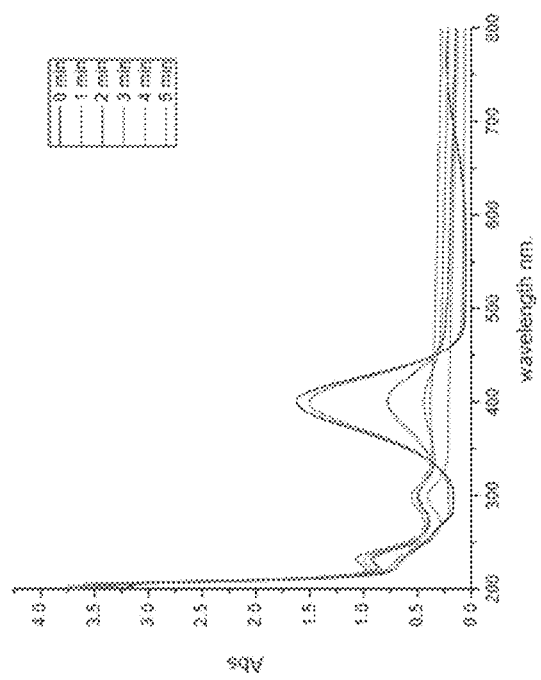
Figure 4:
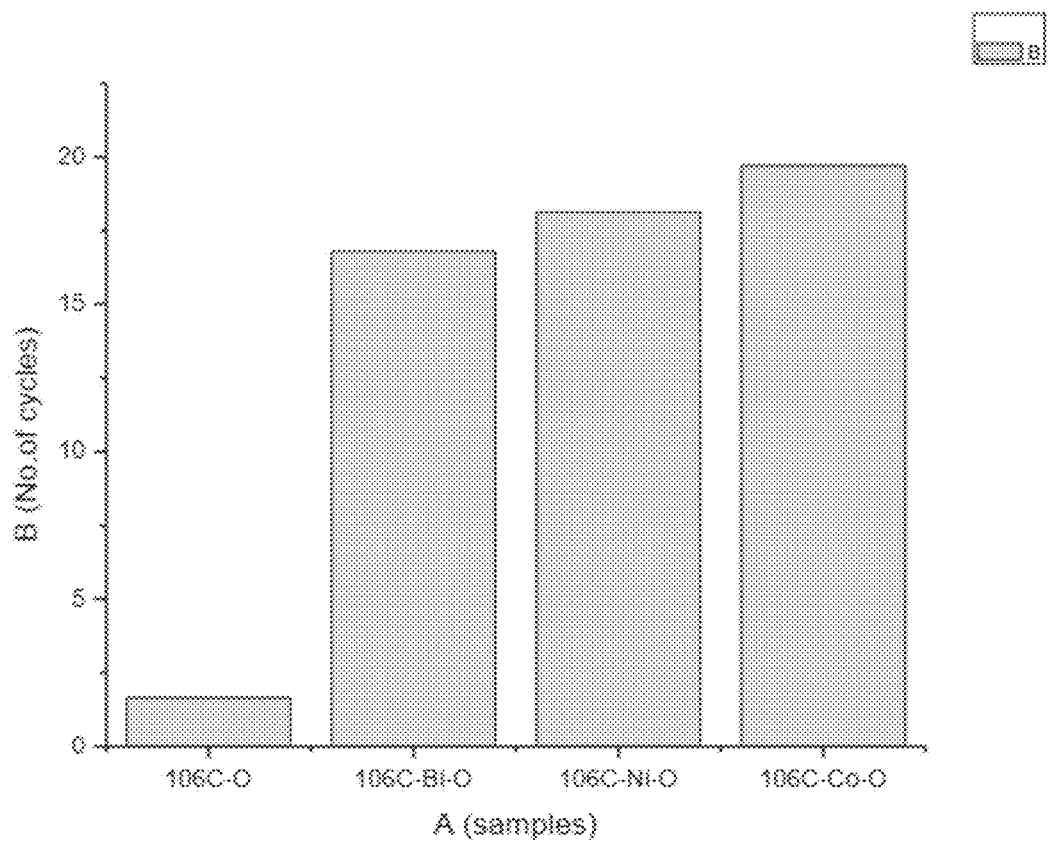
FIG. 4 is a chart showing a comparison of the number of cycles for PNP reduction by different iron oxide nanocomposites.
Figure 5A:
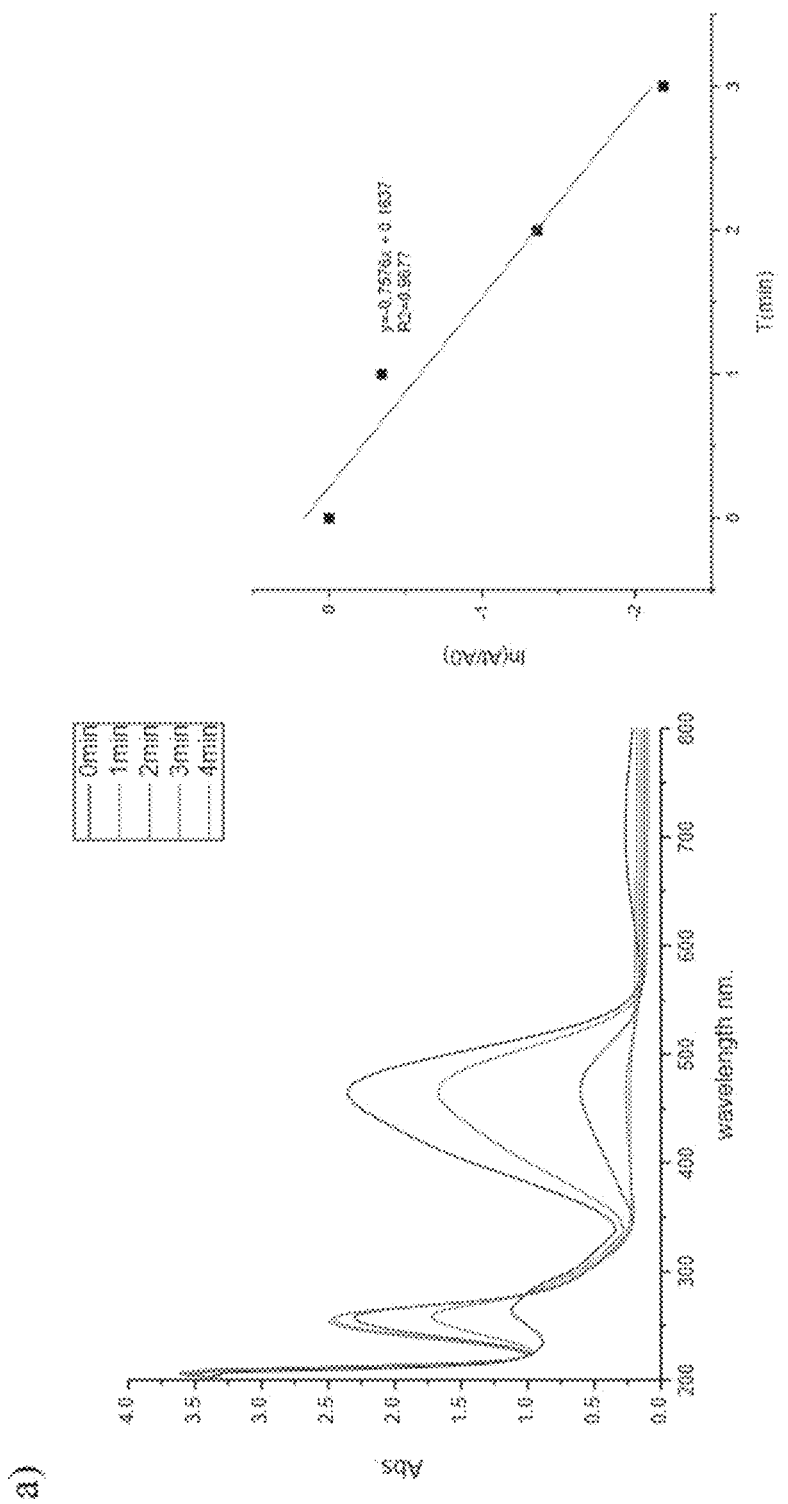
FIGS. 5A-5C are graphs showing the catalytic activity and kinetic rate of reduction of methyl orange (MO) azo pollutant with $NaBH_4$ by iron carbon nanocomposites (5A) 106C—Co, (5B) 106C—Ni, and (5C) 106C—Bi.
Figure 5B:
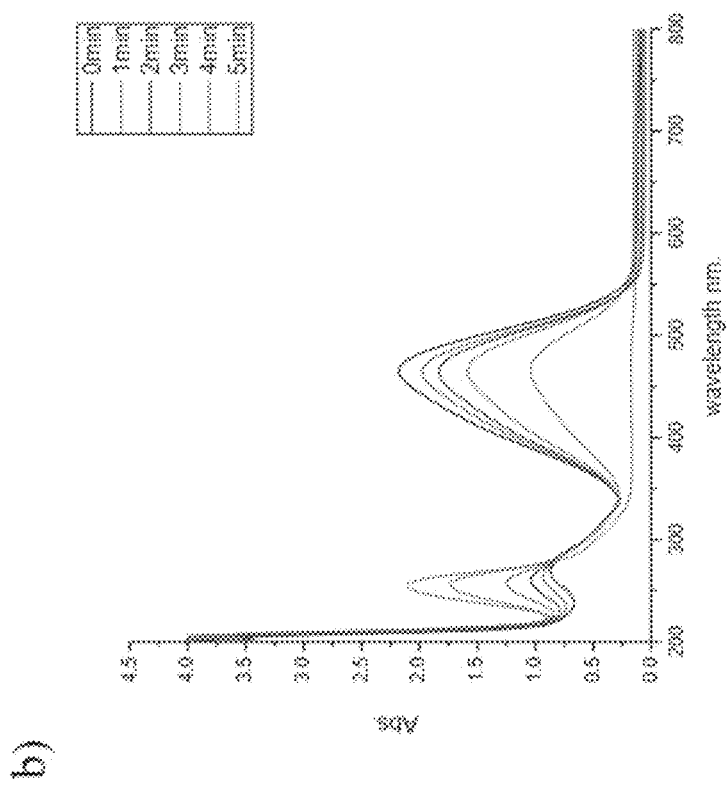
Figure 5C:
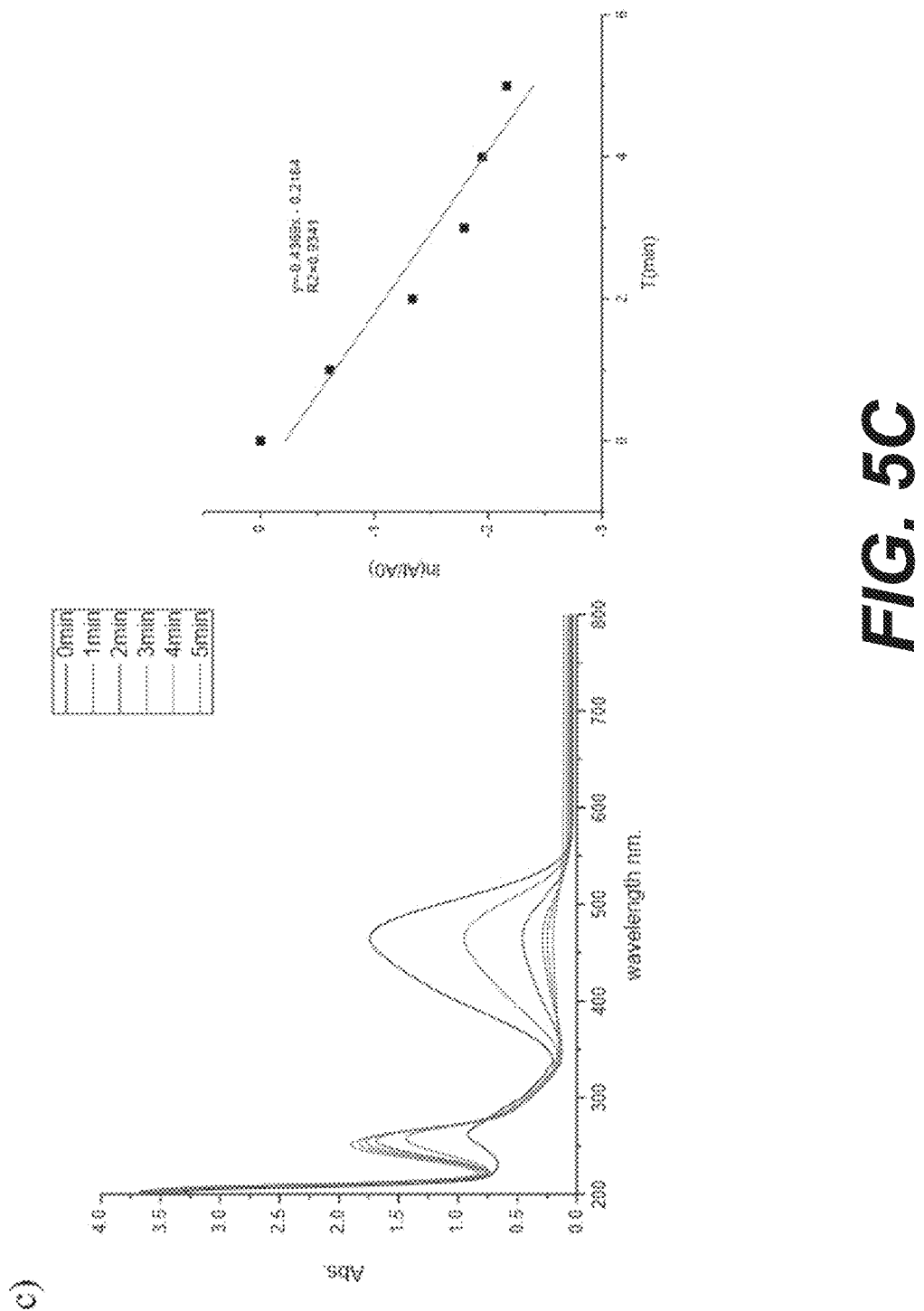
Figure 6:
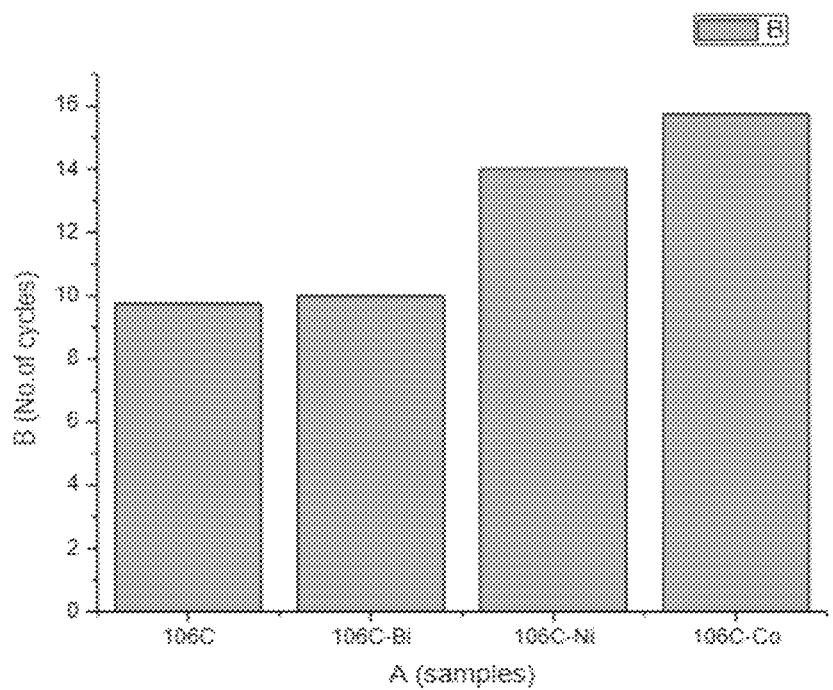
FIG. 6 is a chart showing a comparison of the number of cycles for MO reduction by different iron carbon nanocomposites.
Figures 7A, 7B:
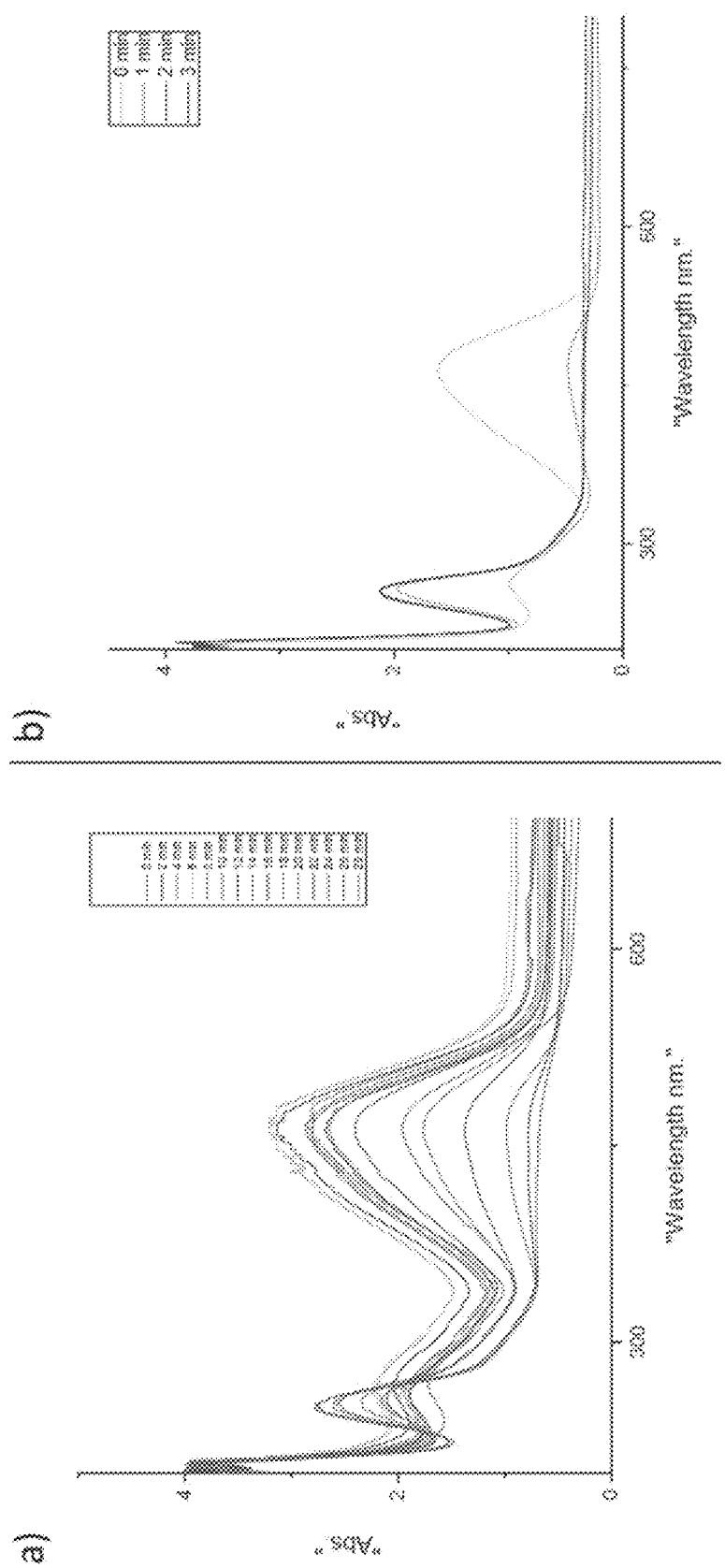
FIGS. 7A-7D are graphs showing the kinetic rate and catalytic reduction activity of MO with NaBH4 by iron oxide nanocomposites (7A) 106C—O, (7B) 106C—Co—O, (7C) 106C—Ni—O, and (7D) 106C—Bi—O.
Figures 7C, 7D:
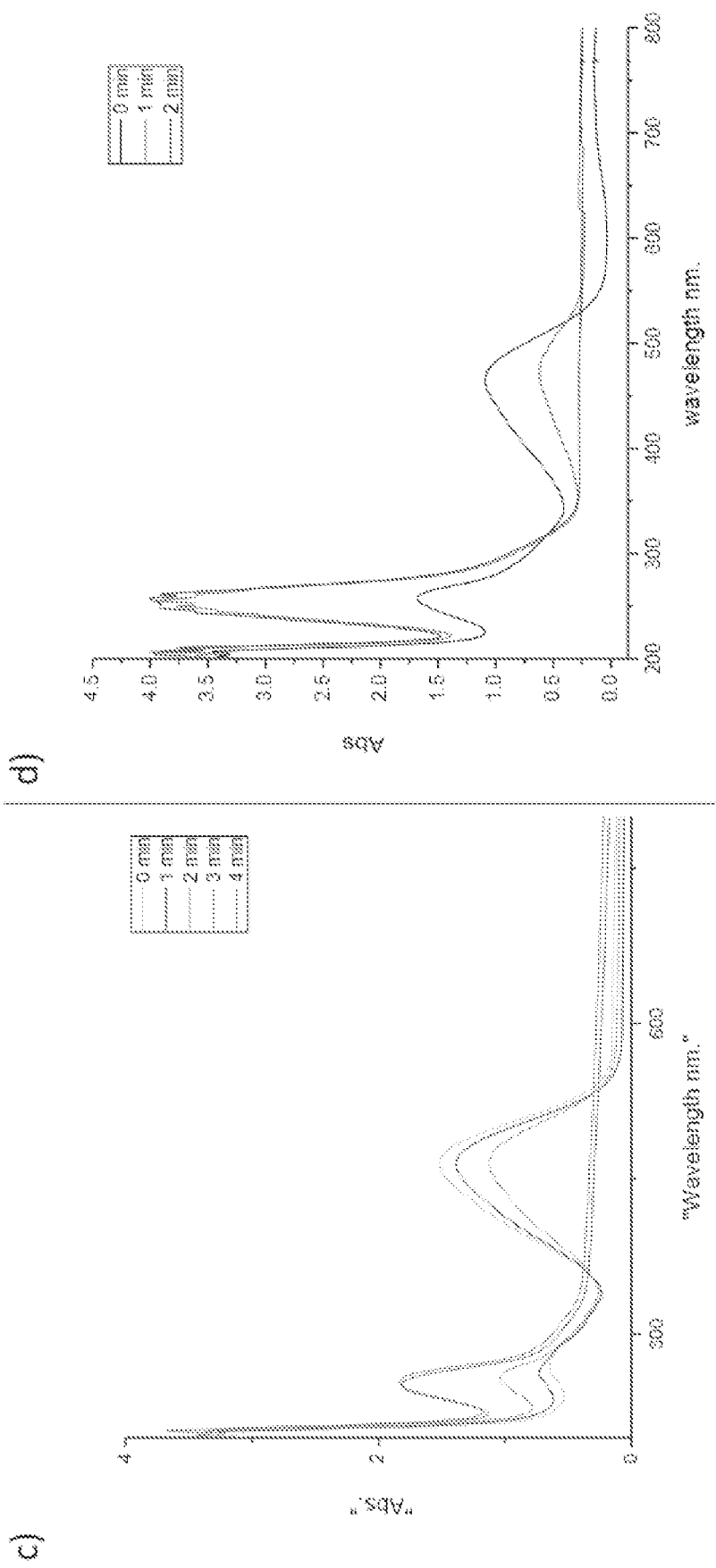
Figure 8:
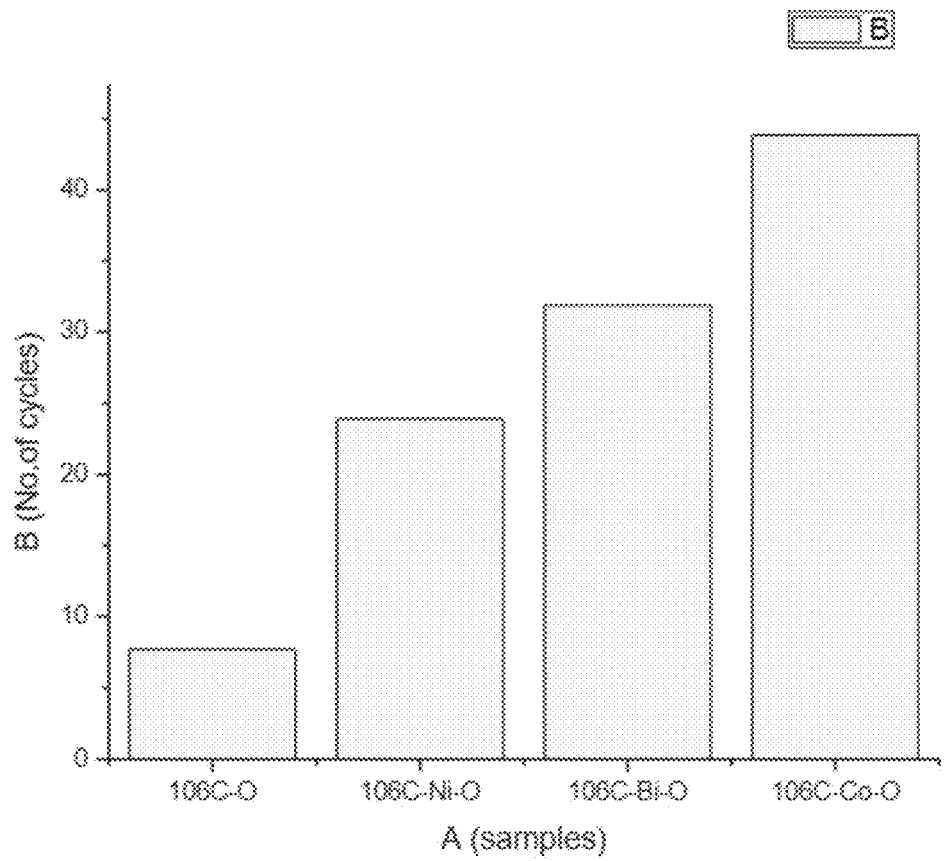
FIG. 8 is a chart showing a comparison of the number of cycles for MO reduction by different iron oxide nanocomposites.

The following definitions are provided for the purpose of understanding the present subject matter and for construing the appended patent claims.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It will be understood by those skilled in the art with respect to any chemical group containing one or more substituents that such groups are not intended to introduce any substitution or substitution patterns that are sterically impractical and/or physically infeasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter. For example, if a range of 1 μm to 8 μm is stated, it is intended that 2 μm, 3 μm, 4 μm, 5 μm, 6 μm, and 7 μm are also explicitly disclosed, as well as the range of values greater than or equal to 1 μm and the range of values less than or equal to 8 μm.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to metal carbon and oxide nanocomposites prepared by a simple, low energy demanding, and high yield method. The metal carbon nanocomposites can be prepared with or without a support such as silica, graphite, silicates, and zeolites. Both metal carbon and metal oxides nanocomposites are more efficient in catalytic reduction and oxidation of p-nitrophenol and azo dyes than other reported materials. They have high rate constants, number of catalytic cycles, and catalytic turn over number (TON) compared to currently used materials.

Various aspects now will be described more fully hereinafter. Such aspects may, however, be embodied in many different forms and should not be construed as limited to the embodiments set forth herein. Rather, these embodiments are provided so that this disclosure will be thorough and complete, and will fully convey its scope to those skilled in the art.

In an embodiment, the present subject matter relates to a method for preparing metal nanocomposites using chemical vapor condensation, the method comprising: providing a metal complex and a carbon source at room temperature; heating the metal complex and the carbon source to a temperature of about 700° C. to about 850° C. in multiple steps in an inert gas or vacuum furnace to evaporate and decompose the metal complex and the carbon source; forming catalyst nanoparticles comprising the evaporated metal complex and the evaporated carbon source; and cooling the catalyst nanoparticles to condense the catalyst nanoparticles into core-shell nanomaterials comprising central metal nanoparticles surrounded by a carbon shell.

In an embodiment, the heating of the metal complex and the carbon source from room temperature to a temperature of about 700° C. to about 850° C. can occur in multiple steps of increased and constant temperature stages in an inert gas or vacuum furnace. By way of non-limiting example, there can be a first heating step followed by a second step conducted at a constant temperature, followed by a third heating step, and the like until this stage of the process is completed. Further, while the bulk of materials used in this process require a final heated temperature of about 700° C. to about 850° C., depending on the materials used, it is possible the final heated temperature can be lower, for example, as low as about 600° C. In some embodiments, the final heated temperature can be any of 600° C., 625° C., 650° C., 675° C., 700° C., 725° C., 750° C., 775° C., 800° C., 825° C., or 850° C.

In a further embodiment, should a metal oxide be desired, the produced nanomaterials can be further treated in an air furnace at an elevated temperature of about 350° C. to about 475° C., about 425° C., or about 350° C., about 375° C., about 400° C., about 425° C., about 450° C., or about 475° C., to provide, the oxide nanocomposites.

Figure 9:
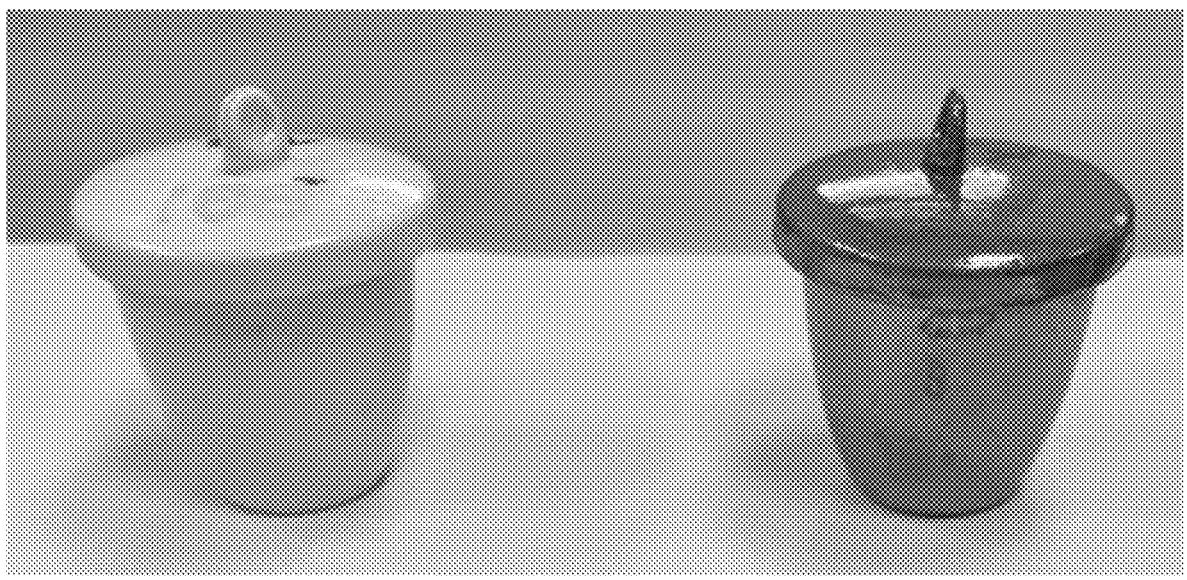
FIG. 9 is an image showing a porcelain crucible before (white) and after chemical vapor condensation of pyrolyzed cobalt complex "Silver-black".

In another embodiment, the evaporation and decomposition step can result in the catalyst nanoparticles being formed in the gaseous phase, thereby helping to form 2D carbon nanomaterials from the recombination of the carbonaceous gas. Cooling can help condensation of volatiles materials into the core shell nanomaterials having central metal nanoparticles surrounded by a 2-D/3-D carbon shell. If a substrate is also used, the formed nanomaterial can form a coating that covers the substrate materials, or can form a thin film on plates like a porcelain crucible as shown in FIG. 9. Following the present process, the white wall of the crucible had deposited thereon a mirror like coat of silvery lustrous shiny metal carbon nanomaterials.

According to one embodiment, the metal complex used in the present methods can comprise one or more of a metal selected from the group consisting of iron, cobalt, nickel, bismuth, copper, zinc, aluminum, and mixtures thereof; a ligand selected from the group consisting of phenanthroline ions, bipyridine ions, terephthalate ions, and mixtures thereof; and a counterion selected from the group consisting of sulfate anions, chloride anions, nitrate anions, and mixtures thereof. In another embodiment, the carbon source used in the present methods is selected from the group consisting of biphenyl, naphthalene, anthracene, pyrene, and mixtures thereof.

In those embodiments not including use of a support or substrate, metal composites can be obtained in the form of small size nanomaterials based on the formation of a thin coat on the nanoparticle support, which otherwise would deposit as large particles, flakes, or plates. In the past, such large particles, flakes, or plates would typically occur due to the type of precursor used. Thus, incorporation of a reducing metal to improve oxidation/reduction activity, such as, by way of non-limiting example, aluminum, zinc, or bismuth, would be hindered since these metals alone or combined with other transition metals typically do not form nanoparticles through pyrolysis. This is not desired herein, as the nanoparticles size is a key factor to determine their catalytic activity. Thus, certain embodiments of the present subject matter relate to core/shell nanoparticles with the core comprising nano silica and the shell having cobalt, nickel, or iron as a primary metal with zinc, aluminum, or bismuth as a secondary metal. Therefore, preparation of nanocomposites with two types of metals, primary and secondary, each having different properties, is possible using the present methods, which was not possible and/or difficult previously.

In another, optional, embodiment, the present methods can comprise the further step of forming a coating of the core-shell nanomaterials on a substrate. According to these embodiments, the substrate is selected from the group consisting of silica, graphite, zeolite, kaolin powder, porcelain, ceramic plates, and mixtures thereof. The porcelain, for example, can take the form of a formed product, such as a porcelain crucible or the like.

In those embodiments including preparation of nanocomposite coats on solid plates or other substrates, the present methods have advantages over other reported methods such as Chemical vapor deposition (CVD) and the Laser Ablation method, since it can form nanoparticles coated on a larger surface area. This coating could be also applied on the surface of different shapes. such as, by way of non-limiting example, on glass microscope slides. According to this example, the prepared slides can be used in catalysis, electrocatalysis and photocatalysis experiments.

In certain embodiments, the core-shell nanomaterials can comprise up to about 40% by weight of the metal, minor amounts of oxygen and nitrogen, and carbon forming the remainder of the core-shell nanomaterials, i.e., if the metal comprises about 40% by weight of the core-shell nanomaterials, the carbon will comprise the majority of the remaining about 60% by weight of the core-shell nanomaterials. Additional metal (0) powder or metal salt can be added to prepare the mixed metal nanomaterials having the desired final weight composition. The nanomaterials, when present in the final product in their metal (0) or metal oxide form, can be used as adsorbents of pollutants from water or as a catalyst for reductive or oxidative degradation of nitrophenols and azo compounds, particularly in water to be treated. In certain embodiments, the yield of the product from catalytic reduction of nitrophenol or azo dye can be as high 100% for as many as 40 cycles before the need for regeneration of the catalyst.

In further embodiments, the central metal nanoparticles in the core-shell nanomaterials produced according to the present processes can comprise elemental metal, mixed metals, a metal oxide, or a combination thereof. In this regard, the central metal nanoparticles can comprise a metal selected from the group consisting of iron, iron-cobalt, iron-nickel, iron-bismuth, iron oxide, iron-cobalt oxide, iron-nickel oxide, iron-bismuth oxide, and mixtures thereof. Other mixtures of metals, for example, iron-aluminum, iron-zinc, or the like, or oxides of metals, for example, iron-aluminum oxide, iron-zinc oxide, or the like, are further contemplated herein.

In one embodiment, the chemical vapor condensation described herein does not include the use of a carrier gas to carry the precursors from one chamber to another during the synthesis process.

In another embodiment, the present subject matter relates to a metal nanocomposite prepared according to the processes described herein, wherein the metal nanocomposite comprises core-shell nanomaterials comprising central metal nanoparticles surrounded by a carbon shell.

In a further embodiment, the present subject matter relates to a metal nanocomposite catalyst for filtering contaminated water, the catalyst comprising: core-shell nanomaterials comprising central metal nanoparticles surrounded by a carbon shell; wherein the central metal nanoparticles comprise a metal selected from the group consisting of iron, iron-cobalt, iron-nickel, iron-bismuth, iron oxide, iron-cobalt oxide, iron-nickel oxide, iron-bismuth oxide, and mixtures thereof; wherein the core-shell nanomaterials comprise up to about 40% by weight of the metal, minor amounts of oxygen and nitrogen, and carbon forming the remainder of the core-shell nanomaterials; wherein the catalyst is effective as a catalyst for filtering contaminants from water.

In this regard, the present nanomaterials can contain a transition metal M or metal oxide MO as their core with, by way of non-limiting example, a graphite carbon shell C. Such nanomaterials, as discussed herein, can be considered to have a formula, by way of non-limiting example, of MC; MM'C; MO; MC@$SiO_2$; MOC@$SiO_2$; MC@gaphite; MOC@graphite; MC@Kaolin; or MC@Ceramics, where M, M', and MO represent one or more metals or metal oxides forming the core of the nanomaterials, C represents the carbon shell of the nanomaterials, and any @R material (for example, R=$SiO_2$, graphite, kaolin, or ceramic) is an optional substrate having the present nanomaterials coated thereon.

In one embodiment, the present subject matter relates to a method of decontaminating contaminated water, comprising: providing a quantity of water containing a quantity of a contaminant; contacting the quantity of water with an amount of the metal nanocomposite catalyst described herein; and catalytically reducing or oxidizing the contaminant, whereby a quantity of decontaminated water is produced.

In this regard, non-limiting examples of the contaminant that can be decontaminated from the contaminated water can include those selected from the group consisting of para-nitrophenol (PNP) pollutant, methyl orange (MO) azo pollutant, sodium borohydride ($NaBH_4$), and combinations thereof.

In another non-limiting embodiment, the catalytic reduction of the present decontamination methods can occur over a time of up to 250 minutes. Similarly, in a different non-limiting embodiment, the catalytic reduction can occur across up to 45 cycles.

One achievement of the present nanomaterials/metal nanocomposite catalysts is that, when they are used in the present decontamination methods, they can resist degradation during the catalytic reduction. However, the metal nanocomposite catalysts may still degrade slowly, over time and repeated use. Accordingly, in one embodiment, the present decontamination methods can further comprise separating the metal nanocomposite catalyst from the quantity of decontaminated water or the quantity of water and reactivating the metal nanocomposite by rinsing with ethanol and water.

According to certain of the present decontamination methods, both oxidized and reduced forms of the present metal nanocomposites can act as a catalyst for both oxidation and reduction reactions for the degradation of methyl orange and para nitrophenol in water, depending on the reducing or oxidizing agent used. The number of cycles and catalytic turnover (TON) for each thus formed catalyst, in use can be high, as the catalyst remains stable, in use. Also, in the present decontamination methods, the catalyst can be used in a powder form or as a coating, by way of non-limiting example, on silicate slides, which can render easier separation of products from the catalyst and easier regeneration of the catalyst.

EXAMPLES

Example 1

Prepared Nanomaterials

A series of iron carbon nanocomposites were prepared at 700° C. under nitrogen with codes 106C, which contained mainly iron, and also 106C—Co, 106C—Ni, 106-Bi, which contained mixtures of iron plus cobalt, nickel, and bismuth, respectively. To prepare corresponding metal oxides, the produced nanomaterials were further treated in an air furnace at 425° C. to provide the iron oxide nanocomposites 106C—O and the mixed iron metal oxides 106C—Co—O, 106C—Ni—O and 106C—Bi—O.

Example 2

Contaminated Water Treatment

For water treatment purposes, all nanocomposites were tested for catalytic reduction of para-nitrophenol PNP pollutant, and also the azo pollutant methyl orange MO in water with the presence of sodium borohydride $NaBH_4$. In a typical experiment for the catalytic reduction of PNP by iron and mixed metal carbon and oxides nanocomposites, 0.2 mg of nano and 4 mg $NaBH_4$ were placed in a cuvette, with successive addition of 0.028 mg of PNP for each cycle (molar mass of PNP=139.11 g/mol). The decrease in absorbance was measured at λ=400 nm. The following Table 1 summarizes the results obtained, and as shown in FIGS. 1A-C, 2, 3A-B, and 4.

TABLE 1

Catalytic reduction of PNP by iron and mixed metal carbon and oxide nanocomposites in presence of $NaBH_4$

| Nano-composite code | Nb of cycles | Range of cycle time (min) (Duration of experiment (min)) | Rate constant (1/s) | Turn over number TON mg PNP/mg nano (mmol PNP/mg nano) |
|---|---|---|---|---|
| 106C | 5.75 | 36-75 (161) | 0.061-0.0085 | 0.805 (0.00578) |
| 106C—Co | 10.8 | 4-24 (166) | 0.4958-0.0501 | 1.512 (0.010869) |
| 106C—Ni | 9.9 | 9-25 (168) | 0.1466-0.0622 | 1.386 (0.00996) |
| 106C—Bi | 6.8 | 9-26 (132) | 0.1489-0.0753 | 0.952 (0.00684) |
| 106C—O | 0.85 | 240 | 0.0085 | 0.119 (0.000855) |
| 106C—Co—O | 19.7 | 4-20 (240) | 0.3575-0.0662 | 2.758 (0.019826) |
| 106C—Ni—O | 18.12 | 4-16 (182) | 0.4259-0.1171 | 2.537 (0.0182359) |
| 106C—Bi—O | 16.8 | 3-60 (263) | 0.1755-0.0455 | 2.352 (0.016907) |

In a typical experiment for the catalytic reduction of MO by iron and mixed metal carbon and oxides nanocomposites: 0.2 mg of nano composites and 4 mg $NaBH_4$ were placed in a cuvette, with successive addition of 0.064 mg of PNP for each cycle (molar mass of MO=329.33 g/mol). The decrease in absorbance was measured at λ=464 nm. The following Table 2 summarized the results obtained, and as shown in FIGS. 5A-C, 6, 7A-D, and 8.

TABLE 2

Catalytic reduction of the MO by iron and mixed metal carbon and oxide nanocomposites in presence of $NaBH_4$

| Nano-composite codes | Nb of cycles | Range of cycle time min (Duration of experiment min) | Rate constant (1/s) | Turn over number TON (mg MO/mg nano) |
|---|---|---|---|---|
| 106C | 9.75 | 5-30 (102) | 0.7586-0.0407 | 3.12 (0.0095316) |
| 106C—Co | 15.75 | 4-24 (200) | 0.7576-0.0589 | 5.04 (0.015397) |
| 106C—Ni | 14 | 2-20 (176) | 0.6279-0.1081 | 4.48 (0.013686) |
| 106C—Bi | 10 | 5-50 (226) | 0.4369-0.0456 | 3.2 (0.009776) |
| 106C—O | 7.7 | 3-40 (158) | 0.3899-0.0377 | 2.464 (0.0075275) |
| 106C—Co—O | 43.86 | 3-16 (216) | 0.7951-0.1436 | 14.03 (0.042877) |
| 106C—Ni—O | 23.9 | 2-18 (123) | 0.4823-0.1348 | 7.65 (0.0233648) |
| 106C—Bi—O | 31.9 | 2-16 (137) | 0.6296-0.1841 | 10.21 (0.031185) |

Based on these results, it can be concluded that:

1. Catalytic reduction efficiency based on turn over number (TON) (mmol pollutant/mg nanocomposites) of both PNP and MO is greater for mixed metal oxide nanocomposites than mixed metal carbon nanocomposites, as seen in Tables 1 and 2, and FIGS. 2, 4, 6, and 8. The trend for catalytic reduction (TON) of PNP by iron nanocomposites is: 106C—Co—O>106C—Ni—O>106C—Bi—O>106C—Co>106C—Ni>106C—Bi>106C>106C—O, while the trend for catalytic reduction (TON) (mmol pollutant/mg nanocomposites) of MO by iron nanocomposites is similar to PNP except for 106-C—Bi—O as follows: 106C—Co—O>106C—Bi—O>106C—Ni—O>106C—Co>106C—Ni>106C—Bi>106C>106C—O.

2. The catalytic reduction (TON) mmol/mg of MO and PNP and the number of cycles for the iron nanocomposite are smaller than for the mixed metal nanocomposite for both metal carbon and metal oxide nanocomposite series, as seen in Tables 1 and 2, and FIGS. 2, 4, 6, and 8.

3. The catalytic reduction (TON) mmol/mg by each iron nanocomposite for MO is greater than for PNP, as seen in Tables 1 and 2, and FIGS. 2, 4, 6, and 8.

4. The iron nanocomposites are efficient, robust and resist degradation during reduction experiments with PNP and MO. Cycles of multiples of ten were obtained without regeneration of the nanocatalyst. For example, 44 cycles were obtained with 106C—Co—O for MO and the TON number was 14.03 mg/mg (0.0429 mmol/mg) without regeneration. However, the nano catalyst can still be easily separated from aqueous solution by centrifugation and reactivated by rinsing with ethanol and water and new tenth of cycles could be further achieved.

5. The first order rate constant value of catalytic reduction of PNP and MO decreased with increases in the number of cycles, as seen in Tables 1 and 2, and FIGS. 1, 3, 5, and 7.

It is to be understood that the metal carbon and oxide nanocomposites are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing metal nanocomposites using chemical vapor condensation, the method comprising:
providing a metal complex and a carbon source at room temperature;
heating the metal complex and the carbon source to a temperature of about 700° C. to about 850° C. in multiple steps in an inert gas or vacuum furnace to evaporate and decompose the metal complex and the carbon source;
forming catalyst nanoparticles comprising the evaporated metal complex and the evaporated carbon source; and
cooling the catalyst nanoparticles to condense the catalyst nanoparticles into core-shell nanomaterials comprising central metal nanoparticles surrounded by a carbon shell.

2. The method for preparing metal nanocomposites according to claim 1, wherein the metal complex comprises a metal selected from the group consisting of iron, cobalt, nickel, bismuth, copper, zinc, aluminum, and mixtures thereof.

3. The method for preparing metal nanocomposites according to claim 1, wherein the metal complex comprises a ligand selected from the group consisting of phenanthroline ions, bipyridine ions, terephthalate ions, and mixtures thereof.

4. The method for preparing metal nanocomposites according to claim 1, wherein the metal complex comprises a counterion selected from the group consisting of sulfate anions, chloride anions, nitrate anions, and mixtures thereof.

5. The method for preparing metal nanocomposites according to claim 1, wherein the carbon source is selected from the group consisting of biphenyl, naphthalene, anthracene, pyrene, and mixtures thereof.

6. The method for preparing metal nanocomposites according to claim 1, further comprising forming a coating of the core-shell nanomaterials on a substrate.

7. The method for preparing metal nanocomposites according to claim 6, wherein the substrate is selected from the group consisting of silica, graphite, zeolite, kaolin powder, porcelain, ceramic plates, and mixtures thereof.

8. The method for preparing metal nanocomposites according to claim 1, wherein the core-shell nanomaterials comprise up to about 40% by weight of the metal, minor amounts of oxygen and nitrogen, and carbon forming the remainder of the core-shell nanomaterials.

9. The method for preparing metal nanocomposites according to claim 1, wherein the central metal nanoparticles in the core-shell nanomaterials comprise elemental metal, mixed metals, a metal oxide, or a combination thereof.

10. The method for preparing metal nanocomposites according to claim 9, wherein the central metal nanoparticles comprise a metal selected from the group consisting of iron, iron-cobalt, iron-nickel, iron-bismuth, iron oxide, iron-cobalt oxide, iron-nickel oxide, iron-bismuth oxide, and mixtures thereof.

11. The method for preparing metal nanocomposites according to claim 1, wherein the chemical vapor condensation does not include use of a carrier gas.

12. A metal nanocomposite prepared according to the process of claim 1, wherein the metal nanocomposite comprises core-shell nanomaterials comprising central metal nanoparticles surrounded by a carbon shell.

* * * * *